United States Patent
Zellweger et al.

(10) Patent No.: US 8,468,452 B2
(45) Date of Patent: Jun. 18, 2013

(54) SYSTEM AND METHOD FOR CALLING ATTENTION TO A LOCATION OF DEPARTURE IN A DISPLAY

(75) Inventors: Polle T. Zellweger, Bellevue, WA (US); Bay-Wei Chang, Foster City, CA (US); Jock D. Mackinlay, Bellevue, WA (US)

(73) Assignee: Xerox Corporation, Norwalk, CT (US)

( * ) Notice: Subject to any disclaimer, the term of this patent is extended or adjusted under 35 U.S.C. 154(b) by 222 days.

(21) Appl. No.: 11/302,996

(22) Filed: Dec. 14, 2005

(65) Prior Publication Data
US 2006/0150080 A1 Jul. 6, 2006

Related U.S. Application Data

(60) Provisional application No. 60/636,278, filed on Dec. 15, 2004.

(51) Int. Cl.
*G06F 3/048* (2006.01)
(52) U.S. Cl.
USPC ........... 715/711; 715/706; 715/803; 715/804; 715/861; 715/205
(58) Field of Classification Search
USPC ................. 715/706, 711, 715, 803, 804, 861, 715/205
See application file for complete search history.

(56) References Cited

U.S. PATENT DOCUMENTS

| 2,454,898 | A | * | 11/1948 | Tuthill | 156/247 |
| 5,621,871 | A | * | 4/1997 | Jaremko et al. | 345/441 |
| 5,870,768 | A | | 2/1999 | Hekmatpour | |
| 6,185,582 | B1 | | 2/2001 | Zellweger et al. | |
| 6,230,170 | B1 | * | 5/2001 | Zellweger et al. | 715/205 |
| 6,256,649 | B1 | | 7/2001 | Mackinlay et al. | |
| 6,763,479 | B1 | * | 7/2004 | Hebert | 714/4 |
| 6,763,497 | B1 | * | 7/2004 | Softky | 715/205 |
| 7,117,437 | B2 | * | 10/2006 | Chen et al. | 715/530 |
| 7,120,622 | B2 | * | 10/2006 | Zellweger et al. | 1/1 |
| 7,188,306 | B1 | * | 3/2007 | Chang et al. | 715/205 |
| 7,231,597 | B1 | * | 6/2007 | Braun et al. | 715/201 |
| 2004/0193597 | A1 | * | 9/2004 | Johnson | 707/6 |
| 2005/0216859 | A1 | * | 9/2005 | Paek et al. | 715/810 |

OTHER PUBLICATIONS

Baecker & Small "Animation at the Interface," The Art of Human-Computer Interface Design, B. Laurel ed., at http://www.cs.umd.edu/~bederson/classes/cmsc838b/papers/animation.html (visited May 6, 2003).
Baecker et al., "Bringing Icons to Life," *ACM Conference on Human Factors in Computing Systems (CHI'91)*, pp. 1-6 (1991).
Bartram et al., "The Continuous Zoom: The Constrained Fisheye Technique for Viewing and Navigating Large Information Spaces," *UIST '95*, pp. 207-215 (1995).

(Continued)

*Primary Examiner* — Steven Sax
*Assistant Examiner* — Linh K Pham
(74) *Attorney, Agent, or Firm* — Patrick J. S. Inouye; Krista A. Wittman

(57) ABSTRACT

A system and method that calls attention to a location of departure in a display includes and interaction system and a content presentation system. The interaction system identifies each interaction with an area in a first display. The content presentation system upon return to the first display from a second display changes the first display to draw attention to the identified area with an animation. The animation expires after a first period of time.

12 Claims, 13 Drawing Sheets

OTHER PUBLICATIONS

Bartram et al., "The Intelligent Zoom as Metaphor and Navigation Tool in a Multi-Screen Interface for Network Control Systems," *Proceedings of IEEE Systems, Man and Cybernetics*, pp. 1-6 (1995).

Bartram, "Enhancing Information Visualization with Motion," in PhD Thesis for Simon Fraser University, pp. 1-183 (2001).

Buchanan & Zellweger, "Specifying Temporal Behavior in Hypermedia Documents," *ECHT '92 (Proceedings of the ACM Conference on Hypertext)*, pp. 1-12 (1992).

Chang et al., "Fluid Documents," at http://www2.parc.com/istl/projects/fluid/ (visited Jul. 28, 2001).

Chang et al., "A Negotiation Architecture for Fluid Documents," *Proceedings of UIST'98*, pp. 123-132 (1998).

Chang & Ungar, "Animation: From Cartoons to the User Interface," *UIST '93*, pp. 45-55 (1993).

Chang et al., "Fluidly Revealing Information in Fluid Documents," *AAAI Smart Graphics Spring Symposium 2000*, pp. 1-4 (2000).

Gold et al., "Fluid Fiction: Harry the Ape," at http://www.theredshift-xfr.com/fluid_fiction.html (visited Jul. 25, 2001).

Igarashi, "Fluid Visualization of Spreadsheet Structures," *1998 IEEE Symposium on Visual Languages*, pp. 118-125 (1998).

MacKinlay et al., "An Organic User Interface for Searching Citation Links," at http://www.acm.org/sigchi/chi95/Electronic/documnts/papers/jdm_bdy.htm (visited Jul. 25, 2001).

MacKinlay et al., "The Perspective Wall: Detail and Context Smoothly Integrated," *CHI '91*, pp. 173-179 (1991).

McCrickard, "Maintaining Information Awareness in a Dynamic Environment: Assessing Animation as a Communication Mechanism," PhD Thesis for Georgia Institute of Technology, at http://people.cs.vt.edu/~mccricks/papers/thesis-chap/thesis.html (visited Jul. 9, 2003).

Moran et al., "I'll Get That off the Audio: A Case Study of Salvaging Multimedia Meeting Records," CHI' 97 Electronic Publications, at http://www.acm.org/sigchi/chi97/proceedings/paper/tpm.htm (visited Jul. 25, 2001).

Robertson et al., "Cone Trees: Animated 3D Visualizations of Hierarchical Information," *ACM SIGCHI conference on Human Factors in Computing Systems '91*, pp. 189-194 (1991).

Roberston et al., "Information Visualization Using 3D Interactive Animation," *Communication of the ACM* 36(4):57-71 (1993).

google.com™, "Fluid Documents," at http://www.google.com (visited Nov. 30, 2001).

Stasko, "Animation in User Interfaces: Principles and Techniques," *User Interface Software*, pp. 81-101 (1993).

Ware, "Patterns in Motion," *Information Visualization: Perception for Design*, Morgan Kauffman, New York, pp. 230-240 (2000).

Ware, "Animated Images Versus Words," *Information Visualization: Perception for Design*, Morgan Kauffman, New York, pp. 320-322, (2000).

Ware, "Animated Visual Languages," *Information Visualization: Perception for Design*, Morgan Kauffman, New York, pp. 329-333, (2000).

Zellweger et al., "Fluid Links for Informed and Incremental Hypertext Browsing," *CHI '99 Extended Abstracts*, pp. 1-2 (1999).

Zellweger et al., "Fluid Links for Informed Incremental Link Transitions," *Proceedings of Hypertext '98*, pp. 50-57 (1998).

Zellweger et al., "The Impact of Fluid Documents on Reading and Browsing: An Observational Study," *Proceedings of ACM CHI 2000 Conference on Computer-Human Interaction*, pp. 249-256 (2000).

Zellweger et al., "Fluid Links for Informed and Incremental Hypertext Browsing," in PowerPoint Slide Show, Orally presented at CHI'99, Pittsburgh, PA (1999) (Power Point slide show was not distributed at CHI'99).

Zellweger, "Scripted Documents: A Hypermedia Path Mechanism," *Hypertext '89*, pp. 1-14 (1989).

* cited by examiner

SYSTEM AND METHOD FOR CALLING ATTENTION TO A LOCATION OF DEPARTURE IN A DISPLAY

This application claims the benefit of U.S. Provisional Patent Application Ser. No. 60/636,278, filed Dec. 15, 2004, which is herein incorporated by reference in its entirety.

FIELD

This invention relates to a system and method using an animation for a period of time to provide a user with subtle sensory cues with respect to an area or areas of departure within a display.

BACKGROUND

Typical hypertext documents, such as MS Word®, MS Excel®, MS Power Point® or Web pages and other types of displays, such as a window, impose an undue amount of cognitive overhead on readers. For instance, traversing hyperlinks within a source page, determining their relevance, and returning to the source page may disrupt a reader's attention and fragment the reading process. Similarly, within a window a user may have difficulty in determining which links have already been traversed and which one was most recently traversed.

With respect to documents which are displayed, the use of fluid hypertext documents has significantly improved the reading process. Fluid documents use special user interface techniques to provide users with smooth, lightweight and contextual access to additional, supporting information (i.e., annotations) associated with the primary information in a document. This approach involves altering the graphics or typography of a document to show the annotations in the context of the primary information they annotate. When a reader expresses interest in an annotation, space must be made within the document to display the annotation.

Several fluid graphical techniques are used for displaying annotations, such as the fluid interline, margin call-out and overlay methods, in accordance with one or more embodiments disclosed in U.S. Pat. No. 6,230,170 to Zellweger et al., titled "SPATIAL MORPHING OF TEXT TO ACCOMMODATE ANNOTATIONS," which is incorporated herein by reference in its entirety.

Referring to FIGS. 1-2, the fluid interline technique is shown. A display 10 shows a hypertext fluid document including a Nome information link 12 in source information 14 within passage 16. When a reader wants to know more about Nome, Ak., but does not desire leaving the current page in the document, they may express their interest by moving a cursor over the Nome information link 12 using a mouse, for example, and the interline information 18 is displayed, as shown in FIG. 2. In particular, the top and bottom margins of the passage 16 are moved closer to each other, the line spacing within passage 16 is reduced, and the size of the interline information 18 is gradually scaled up from a small size (e.g., a small, unreadable point on the display 10) to a relatively larger, readable size in between the first portion 20 and the second portion 22.

Referring to FIG. 3, the fluid margin call-out technique is shown. Here, the technique involves gradually drawing a line 24 on the display 10 beginning at the Nome information link 12, moving away from the Nome information link 12 towards the nearest right margin, where the line 24 is then drawn to extend in a vertical direction (e.g., up and/or down) as the margin call-out 26 gradually increases in size the same way the interline information 18 does as discussed above in connection with FIG. 2. As the size increases, drawing the line 24 gently guides a reader's eyes toward the margin call-out 26.

Referring to FIG. 4, the fluid overlay technique is shown. As the overlay 28 increases in size the same way the interline information 18 does as discussed above in connection with FIG. 2, the text in the source information 14 directly underneath the overlay 28 gradually fades to a lighter shade of color to enable the overlay 28 to stand out against the source information 14 as it floats over it.

Fluid documents employing the above-described techniques help readers maintain their reading context in a document. However, fluid documents and other types of displays do not distinguish traversed hyperlinks, annotations, and other areas from those that have not been traversed, for example. Since users often arbitrarily visit pages associated with hyperlinks in a document, it has been noticeably difficult for users to re-orient themselves to the location in a page they were accessing upon their return from the traversed page. More generally, users have trouble re-orienting themselves in a display, such as a window, whenever they interrupt their interaction to work with another application or engage in another task.

SUMMARY

A system that calls attention to a location of departure in a display in accordance with embodiments of the present invention includes and interaction system and a content presentation system. The interaction system identifies each interaction with an area in a first display. The content presentation system upon return to the first display from a second display changes the first display to draw attention to the identified area with an animation. The animation expires after a first period of time.

A method and a computer-readable medium having stored thereon instructions for execution by a processor for calling attention to a location of departure in a display in accordance with embodiments of the present invention includes identifying each interaction with an area in a first display. Changing the first display to draw attention to the identified area with an animation upon return to the first display from a second display. The animation expiring after a first period of time.

The embodiments of the present invention provide a number of advantages. For example, the present invention provides for intuitive and smooth content perusal within a display, such as a document or window. Additionally, the present invention enables users to conveniently and naturally determine areas previously interacted within a display, while not imposing an undue amount of effort. Additionally, the embodiments of the present invention provide for a smooth and pleasant reading experience using subtle sensory cues.

BRIEF DESCRIPTION OF THE DRAWINGS

The patent or application file contains at least one drawing executed in color. Copies of this patent or patent application publication with color drawings will be provided by the Office upon request and payment of the necessary fee.

DETAILED DESCRIPTION

A system 30 and method for drawing attention to a location of departure in a display, such as a document or window, upon return to the display in accordance with embodiments of the present invention is shown in FIGS. 5-9. The system 30 includes a server 32 coupled to computers 40(1)-40(n) by way of a local network 44 and a wide area network ("WAN") 46, although system 30 may comprise other types and numbers of systems, devices and networks and in other configurations. The present invention enables users to conveniently determine an area or areas of prior interest within a display without an undue amount of effort. Additionally, the present invention provides for a smooth and pleasant reading experience by using subtle sensory cues, such as animations.

Figure 6:
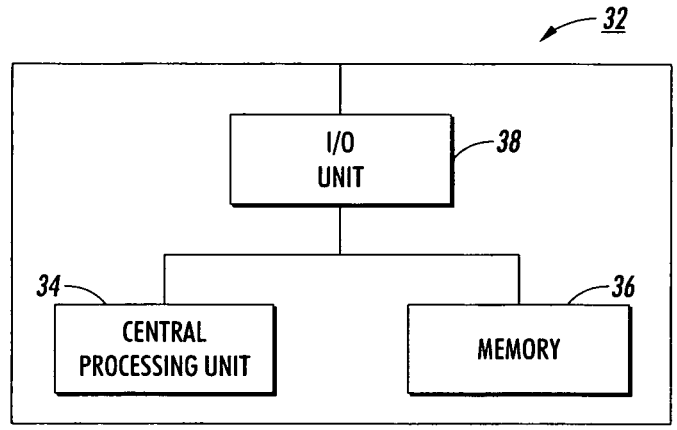
FIG. 6 is a block diagram of a server used in a system for fluidly highlighting documents.

Referring to FIG. 6, the server 32 includes a server processor 34, a server memory 36 and a server I/O unit 38, which are coupled together by one or more bus systems or other communication links, although the server 32 can comprise other types and numbers of elements and in other arrangements. The server processor 34 executes at least a portion of the programmed instructions for drawing attention to a location of departure in a display upon return to the display in accordance with embodiments of the present invention as described herein and as set forth in FIGS. 8 and 10. The instructions may be expressed as executable programs written in a number of computer programming languages, such as BASIC, Pascal, C, C++, C#, Java, Perl, COBOL, FORTRAN, assembly language, machine code language, or any other computer code or language that can be understood and executed by the server processor 34.

Further, these programmed instructions are stored in the server memory 36 for execution by the server processor 34, although some or all of these instructions may be stored and executed elsewhere, such as computer 40(1). The server memory 36 comprises one or more types of fixed or portable memory accessible by the server processor 34, such as ROM, RAM, SRAM, DRAM, DDRAM, hard and floppy-disks, CDs, DVDs, magnetic tape, optical disk, ferroelectric and ferromagnetic memory, electrically erasable programmable read only memory, flash memory, charge coupled devices, smart cards, or any other type of computer-readable media, although memory 36 can comprise other types and numbers of elements and in other arrangements. The server memory 36 is used to store these programmed instructions as well as other information. Server I/O unit 38 enables the server 32 to communicate with computers 40(1)-40(n) by way of WAN 46, although the unit 38 may be coupled directly to computers 40(1)-40(n).

Figure 7:
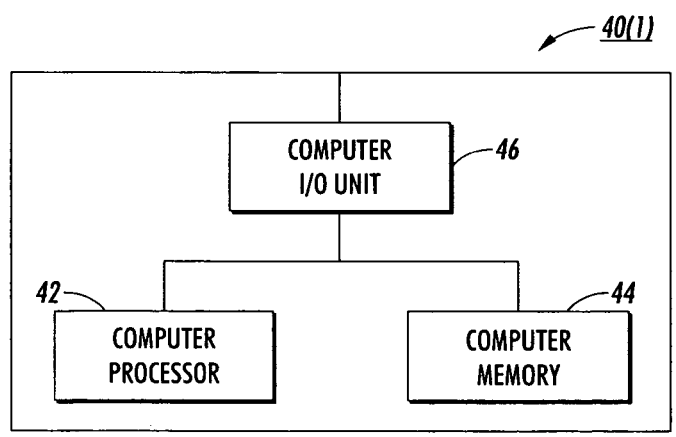
FIG. 7 is a block diagram of a computer used in a system for fluidly highlighting documents.

Referring to FIG. 7, the computer 40(1) includes a computer processor 42, a computer memory 44 and a computer I/O unit 46, which are coupled together by one or more bus systems or other communication links, although the computer 40(1) can comprise other types and numbers of elements and in other arrangements. Further, computer 40(1) may include user input devices, such as a keyboard and a mouse (not illustrated). The computer processor 42 executes one or more aspects of the present invention including at least a portion of the programmed instructions for drawing attention to an area in a display upon return to the display in accordance with embodiments of the present invention as described herein and as set forth in FIGS. 8 and 10.

The instructions may be expressed as executable programs written in the same types of programming languages described above with respect to the server 32 or any other computer code or language that can be understood and executed by the computer processor 42. These programmed instructions are stored in the computer memory 44 for execution by the computer processor 42, although some or all of these instructions and data may be stored elsewhere, such as server 32. The computer memory 44 can be of the same types as the server memory 36 used by the server 32. Computer I/O unit 46 enables the computer 40(1) to communicate with server 32 by way of WAN 46, although the computer 40(1) may communicate directly with server 32. Additionally, the computer 40(n) comprises the same elements as computer 40(1).

Local network 44 couples computers 40(1)-40(n) to each other and to WAN 46. Local network 44 may comprise an Ethernet® network, developed by the assignees of the present invention, although local network 44 may comprise other types of private or public networks or other types of communication systems.

WAN 46 couples the server 32 to the local network 44. In embodiments of the present invention, WAN 46 comprises the Internet, although WAN 46 may comprise other types of public and private networks or other types of communication systems.

Figure 8:
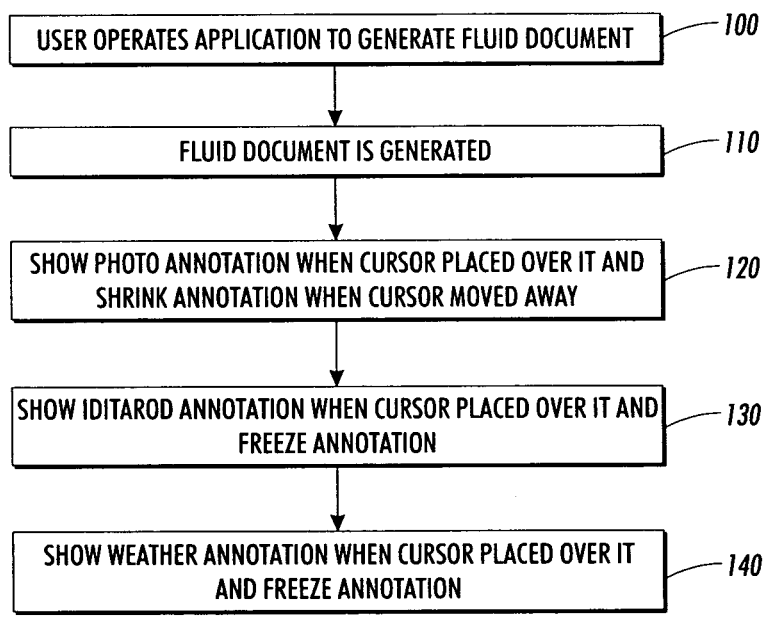
FIG. 8 is a flow chart of a process for fluidly highlighting documents.
Figure 9:
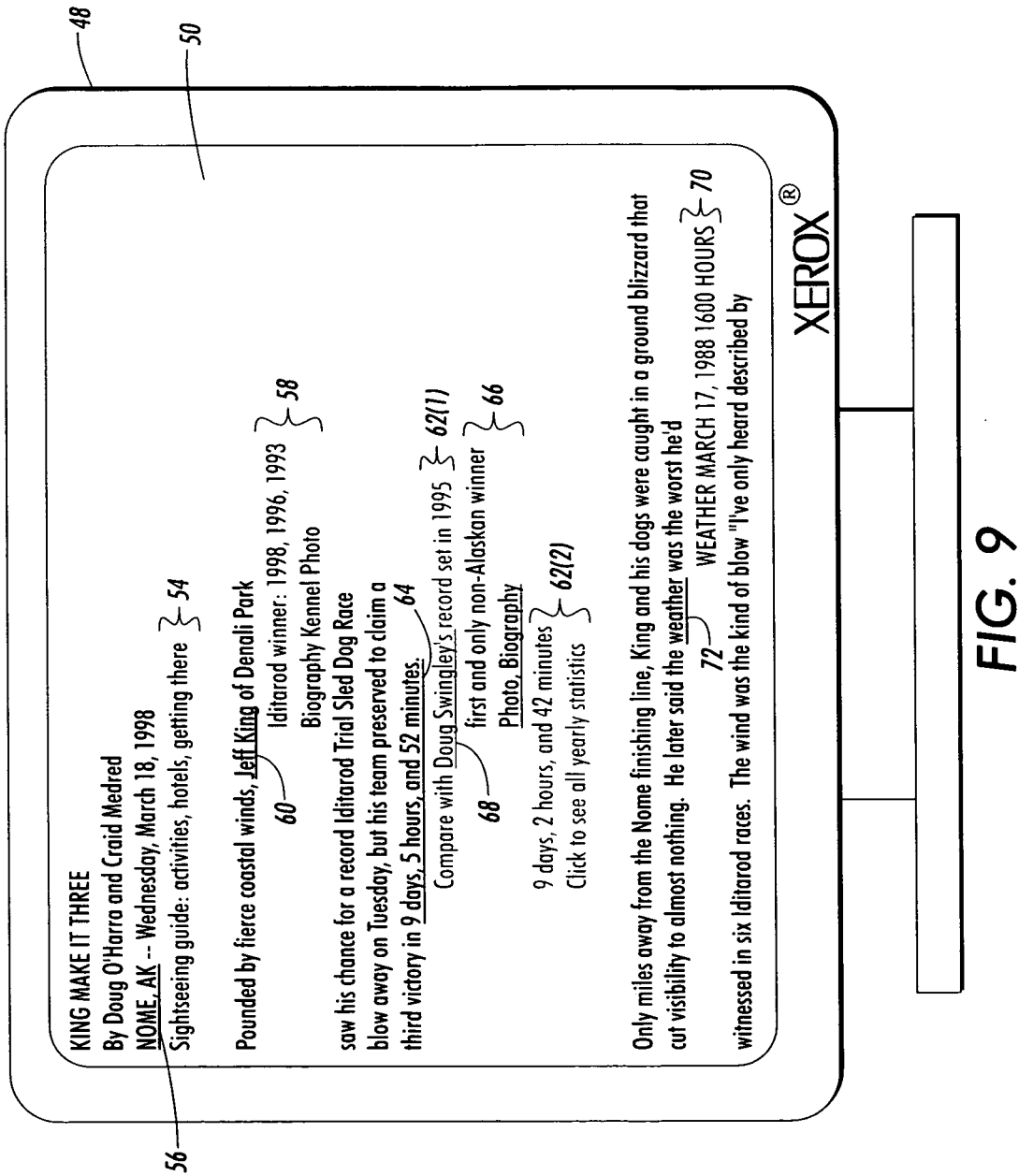
FIG. 9 is a screen shot of a fluid document using color to fluidly highlight traversed documents.

Referring to FIGS. 8-9, the operation of system 30 for drawing attention to an area or areas within a document in accordance with embodiments of the present invention will now be described with reference back to FIGS. 1-5. Although described with reference to a document, this operation can be used for drawing attention to a location or locations of departure in other types of displays, such as to an area or areas of interest in a window in a display device.

Beginning at step 100, computer 40(1) is operated to execute an application for viewing content, such as a Web browser, window, or other type of display. In these embodiments, computer 40(1) requests a fluid document 50 from server 32, although the document 50 or the instructions for generating it may be stored elsewhere, such as at computer 40(1).

At step 110, server 32 transmits to computer 40(1) the instructions to be executed by computer 40(1) for generating fluid document 50 where it is displayed by the display device 48 of the computer 40(1), although again instructions for generating other types of displays can be transmitted and used. These instructions may be transmitted in the form of HTML and/or JavaScript code, although Java Applets, CGI scripts, and/or other types of code may be used.

Freezing an annotation is shown by making a color darker, although other manners for showing that an annotation is frozen can be used. For color animation to identify a location of departure, the hue of the most-recently-visited can be shifted or transitioned to the hue of the previously-visited, although other types of color animations can be used, such as shifting or transitioning a fourth temporary hue to the hue of most-recently-visited. This color animation draws the user's attention to the location of departure in the display.

Referring to FIG. 9, sightseeing annotation 54 is associated with the Nome hyperlink 56 and is shown in dark red; the Iditarod annotation 58 is associated with the Jeff King hyperlink 60 and is shown in dark green; the Doug Swingley annotation 62(1)-62(2) is associated with the days, hours and minutes hyperlink 64 and is shown in bright green; the photo annotation 66 is associated with the Doug Swingley hyperlink 68 and is shown in bright red; and the weather annotation 70 is associated with the weather hyperlink 72 and is shown in blue, although other colors may be used. The Sightseeing 54, Iditarod 58, Doug Swingley 62(1)-62(2), photo 66 and weather 70 annotations each provide additional information about their associated hyperlink or its destination and help readers decide whether or not to follow a hyperlink before a user leaves the document 50.

At step 120, computer 40(1) executes a polling routine to detect signals sent from an input device (e.g., mouse) coupled to computer 40(1) for tracking the movements of the mouse or when mouse buttons are pushed down or unreleased, although other systems for tracking can be used, such as tracking the position of a stylus or an eye tracker system that tracks the coordinates of previously viewed locations. The computer 40(1) tracks the movements to determine whether a user has moved the mouse for manipulating a cursor displayed by the display device 48, although other ways for tracking interaction with an area or areas in this and other displays can be used. Computer 40(1) executes various instructions depending on the detected movements as described further herein. Thus, for example the computer 40(1) may detect that the user has moved the cursor over the Doug Swingley hyperlink 68, causing computer 40(1) to execute the instructions transmitted from server 32 for increasing the size of the photo annotation 66 in the same manner described above with respect to the interline information 18 in FIG. 2. By way of example, manipulations of the input device include dwelling over the hyperlink with a cursor, using a button to click on the hyperlink, and combining a button click with a keyboard entry.

The user may decide the Doug Swingley hyperlink 68 is not relevant and may move the cursor away from the hyperlink 68 to cause computer 40(1) to detect the movement of the mouse and execute instructions for reducing the size of photo annotation 66 until it is no longer present on the document 50 after a predetermined amount of time has elapsed (not illustrated), hereinafter referred to as an example of animation or motion animation. In this example, computer 40(1) is programmed to initiate reducing the size of the annotation 66 from about 300 msec to about one or more seconds from the point in time computer 40(1) detects that the cursor was moved away from the hyperlink 68, although other amounts of time may be used. Although a motion animation is disclosed, other types of animations that disappear after a period of time can be used, such as color changes, existing graphical objects that change size, shape, and/or location, or new graphical objects that are introduced and are animated. Alternatively, the user may decide to traverse the hyperlink 68 and may move the cursor with the mouse over the annotation 66 or the hyperlink 68 and push the mouse button down to signal computer 40(1) to execute instructions for retrieving, loading and displaying a page hyperlinked to the document 50 that is associated with the annotation 66 and the hyperlink 68 in that it provides additional, more detailed information (not illustrated).

At step 130, in this example for a document, computer 40(1) detects that the mouse has moved the cursor over the Iditarod annotation 58 and that one of the mouse buttons has been pushed, such as a "right-click," although again other ways for tracking interaction with an area or areas in this and other displays can be used. In response to the movement and "right-click", computer 40(1) receives and executes the instructions for increasing the size of the annotation 58 (not illustrated) in the same manner described above with respect to the interline information 18 in FIG. 2.

Alternatively, the computer 40(1) detects that the mouse has moved the cursor over the annotation 58 and that one of the mouse buttons has been pushed, such as a "left-click," although again other ways for tracking interaction with an area or areas in this and other displays can be used. In response, computer 40(1) receives and executes the instructions for changing the color of the annotation 58 and causing the annotation 58 to remain displayed in the document 50, hereinafter referred to as "freezing" and variations thereof, although another area or areas which have been accessed in other types of displays can also be frozen. In this example, the computer 40(1) provides an animation by changing the color of Iditarod annotation 58 from its initial bright shade of green (not illustrated) to the darker shade of green shown in FIG. 9 to provide visual feedback to the user of its frozen state. The user may then move the cursor away from the annotation 58, or other area in another display, without causing it to be removed from document 50 as described above in step 120 with respect to the photo annotation 66.

Further, the user may cause the computer 40(1) to change the status of annotation 58 or other area in this or another display from being frozen back to being unfrozen, hereinafter referred to as "thawing," by moving the cursor over the annotation 58 and pushing the mouse button down to signal computer 40(1) to execute the appropriate instructions. When computer 40(1) detects the cursor is no longer over the annotation 58, it executes the instructions for the animation illustrating the size of the annotation 58 being reduce until it is no longer present in the document 50. The above-described freezing and thawing allows users to arrange the Sightseeing 54, Iditarod 58, Doug Swingley 62(1)-62(2), photo 66 and weather 70 annotations in the document 50 to suit their current interests and improve the overall reading process.

At step 140, in this example the computer 40(1) detects that the mouse has moved the cursor over the weather annotation 70 or other area in another display and that one of the mouse buttons has been pushed down, although the computer could detect that the cursor has been moved over the weather hyperlink 72, another hyperlinks or in other embodiment over another area in another display. In response, computer 40(1) receives and executes instructions for displaying the weather annotation 70 as having a blue color, which in embodiments of the present invention indicates annotation 70 is the most recently traversed annotation. Computer 40(1) then executes instructions to freeze the weather annotation 70 or other area in another display as described above in connection with step 130. The user may then move the cursor away from the annotation 70, without causing it to be removed from document 50 as described above in step 120 with respect to the photo annotation 66.

The annotation 70 and hyperlink 72 can be seen in the document 50 by the user until the computer 40(1) executes the instructions to retrieve, load and display its associated hyperlinked page. Upon the user's return to document 50 from the hyperlinked page, computer 40(1) displays weather annotation 70 having the last-traversed color, blue as explained above, for a first period of time from about ½ second to about several seconds, for example, although other periods of time may be used. Although not shown, computer 40(1) gradually changes the color of the weather annotation 70, which again is blue in this example, back to the previously-visited frozen color, which is dark green (not illustrated), although again, other colors may be used. This color change occurs over a second period of time from about ½ second or less, a process hereinafter referred to as "color animation," although again, other periods of time may be used.

The above-described animation features enable users to conveniently scan the document 50 or other display, such as a window, for the last-traversed color or other animation to find their previous reading location, such as weather annotation 70, on document 50 upon returning. Further, the animation reduces the user's need to explicitly scan the document 50 or other display looking for the last-traversed color or other animation. Second, the last-traversed color disappears after it has successfully drawn the user's attention to their previous location in document 50 or other display, and thus avoids cluttering the document 50 or display or needlessly continuing to draw the user's attention.

In embodiments of the present invention, while the annotations 54, 58, 62(1)-62(2), 66 and 70 in document 50 are displayed using an exemplary fluid interline technique as described above in steps 100-140, fluid call-out or overlay techniques may also be used.

Figure 10:
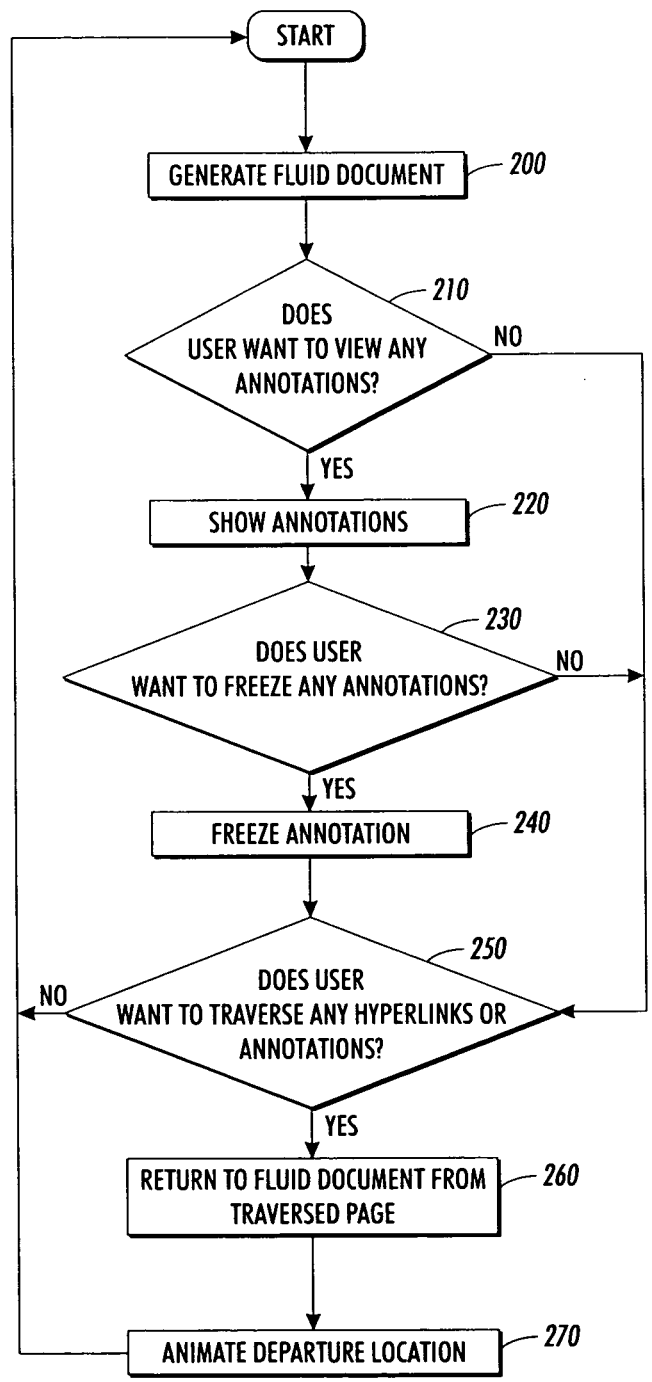
FIG. 10 is a flow chart of a process for fluidly highlighting in accordance with embodiments of the present invention.

A portion of an alternative process for the operation of system 30 for drawing attention to an area or areas within a document in accordance with embodiments of the present invention will now be described in connection with FIGS. 10-11 and with reference back to FIGS. 1-5 and 8. Beginning at step 200, computer 40(1) generates and displays fluid document 80(1) in the same manner described above in connection with steps 100-110 with respect to document 50, except as described herein. Again, although described with reference to a document 50 as the display, the present invention can be used with other types of displays, such as a window. In this example, different colors from those described with reference to Table 1 are used. More specifically, for the browsing condition of most-recently-visited the representative color is now red, for the browsing condition of not-visited the representative color is now blue, and for the browsing condition of previously-visited the representative color remains green, although again other colors can be used. Again freezing is shown by making a color darker, although other manners for showing freezing can be used.

Further, the fluid document 80(1) includes a sweetness annotation 82 associated with a sweetness hyperlink 84 and shown in dark red, and a fermentation annotation 88 associated with a fermentation hyperlink 90 and shown in bright red. The underlined portions of the sweetness hyperlink 84 and the fermentation hyperlink 90 are generated and displayed by computer 40(1) as having a black color, which in embodiments of the present invention indicate that the hyperlinks 84, 90 have not been traversed, although again, other colors and animations may be used in the document 80(1) and in other types of displays.

Computer 40(1) executes instructions to track the movements and actions of the mouse, and hence the cursor displayed in display device 48, to determine whether the user wants to view annotations 82, 88 within document 80(1), although other ways of tracking interactions with an area or areas of a display can be used.

At decision box 210, in this example computer 40(1) determines the user would like to view the sweetness annotation 82 by detecting that the cursor was moved over the sweetness hyperlink 84. The YES branch is followed and step 220 is performed as described herein.

At step 220, computer 40(1) executes instructions for the animation to increase the size of the sweetness annotation 82 to reach its current, readable size in the same manner described above with respect to FIG. 2. Although not shown, initially computer 40(1) generates an empty descriptor and displays it near the left margin of the sweetness annotation 82 to provide users with an indication that annotation 82 is temporary. Moreover, and again not shown, computer 40(1) displays the sweetness annotation 82 as having a bright shade of red to also aid in indicating to the user that the annotation 82 is temporary or thawed.

At decision box 230, in this example computer 40(1) determines the user would like to freeze the sweetness annotation 82 by detecting that the user has pushed the mouse button down while detecting cursor movement over annotation 82, although the computer 40(1) could determine that the user would like to freeze another area of another type of display. The YES branch is followed and step 240 is performed as described herein.

Figure 11:
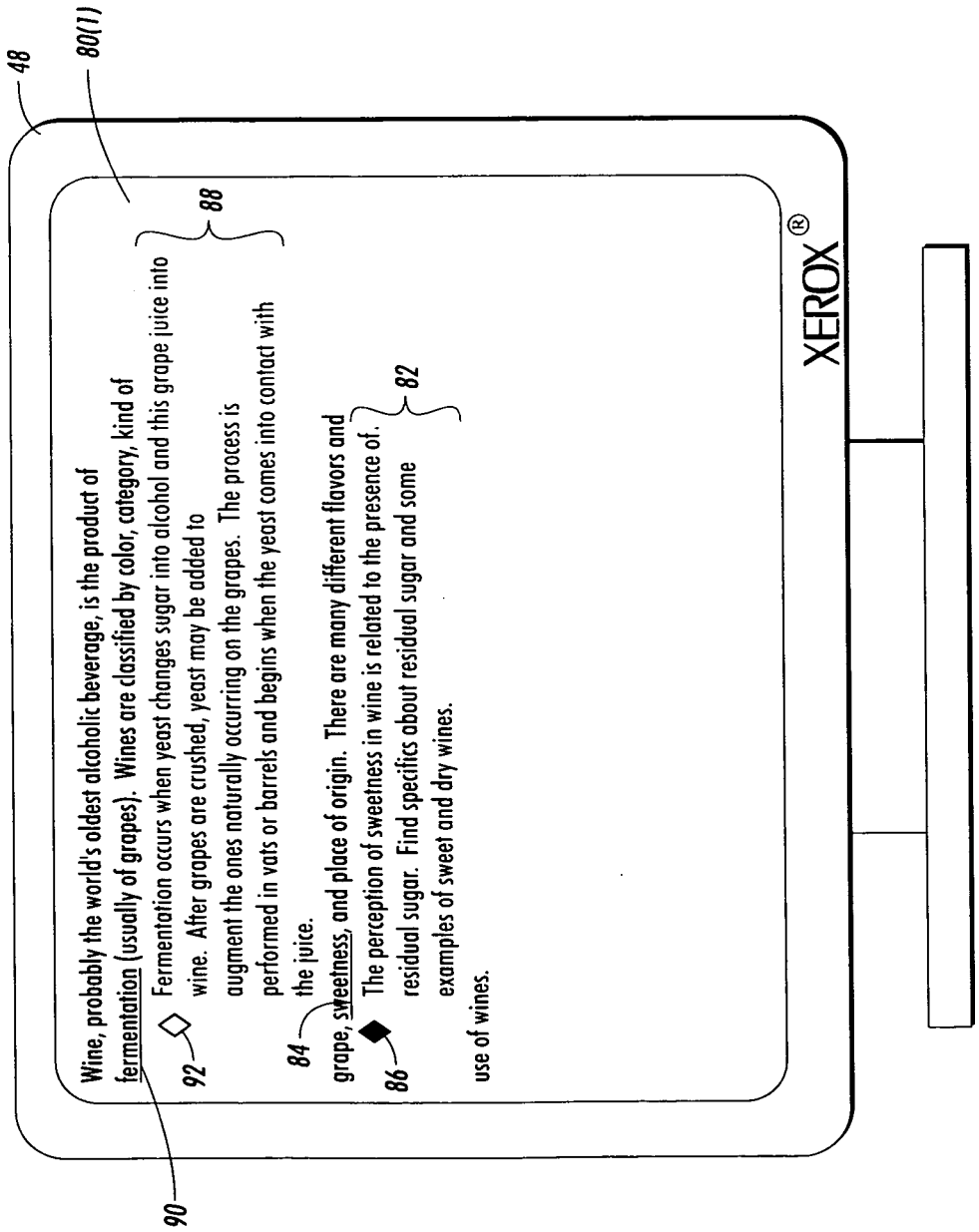
FIG. 11 is a screen shot of a fluid document with a temporary annotation and a frozen annotation.

At step 240, computer 40(1) executes instructions to change the color of the sweetness annotation 82 from its initial bright shade of red (again, not illustrated) to the dark shade of red shown in FIG. 11 to provide the user with visual feedback of its frozen state. Computer 40(1) then generates the solid diamond descriptor 86 as also having the darker shade of red to match the color of the sweetness annotation 82, although any type of numeric, alphanumeric or graphic symbol may be used. The solid diamond descriptor 86 replaces the initial empty descriptor (not illustrated) mentioned above in step 220, and is displayed near the left margin of the annotation 82 for providing users with an additional animation that indicates that the annotation 82 is frozen.

At decision box 250, in this example computer 40(1) determines that the user does not want to traverse any more annotations 82, 88, or hyperlinks 84, 90 in document 80(1) when it does not detect any cursor movements or mouse buttons being pushed, and thus the NO branch is followed. In other embodiments for other types of displays, the computer 40(1) determines that the user does not want to traverse any more areas in the display when it does not detect any cursor movements or mouse buttons being pushed. Thereafter, steps 200-250 may be performed as described above until execution of the computer 40(1) is terminated or the YES branch in decision box 250 is followed because computer 40(1) determines that the user wants to traverse one or more annotations 82, 88 and hyperlinks 84, 90.

Another portion of the alternative process for the operation of system 30 for drawing attention to an area or areas within a document in accordance with embodiments of the present invention will now be described in connection with FIGS. 12-14 and with reference back to FIGS. 1-5, 8 and 10-11. Again, although described with reference to a document 50 as the display, the present invention can be used with other types of displays, such as a window.

Referring back to FIG. 10, steps 200-210 are performed as described above, except at decision box 210, the computer 40(1) detects that the cursor has been moved over the fermentation annotation 88 and that one of the mouse buttons has been pushed down. Thus, the YES branch is followed and step 220 is performed as described herein.

At step 220, computer 40(1) receives and executes instructions to increase the size of fermentation annotation 88 to reach its current, readable size in the same manner described above with respect to FIG. 2, although in other embodiments other areas in other types of displays can be animated in other manners. Computer 40(1) generates an empty diamond shaped descriptor 92 and displays it near the left margin of the annotation 88 to provide users with an indication that annotation 88 is thawed, although other types of symbols can be used, such as a numeric, alphanumeric or graphic symbol. In this example, computer 40(1) displays the fermentation annotation 88 as having a bright shade of red in comparison to the dark shade of red of the sweetness annotation 82. This helps indicate to the user that the annotation 88 is thawed.

At decision box 230, in this example computer 40(1) determines the user would not like to freeze the sweetness annotation 82 by detecting that the cursor has left the area of the annotation 82 without the mouse button being pushed down while detecting cursor movement was over annotation 82, although the computer 40(1) could determine that the user would not like to freeze the annotation in other manners. The NO branch is followed and step 250 is performed as described herein.

At decision box 250, computer 40(1) in this example detects cursor movement over the annotation 88 and that one of the mouse buttons has been pushed down, although cursor movement over the associated hyperlink 90 may be detected. While the computer 40(1) continues to detect that the button remains pushed down, computer 40(1) executes instructions for changing the color of the fermentation annotation 88 to a red color, which is not shown in FIG. 11. Also, the color of the hyperlink 90 (i.e., black) does not change yet. When the computer 40(1) detects that the mouse button has been released, it executes instructions for retrieving, loading and displaying in display device 48 a page hyperlinked to the document 80(1) that is associated with the annotation 88 and the hyperlink 90. The YES branch is followed and step 260 is performed as described herein.

Figure 12:
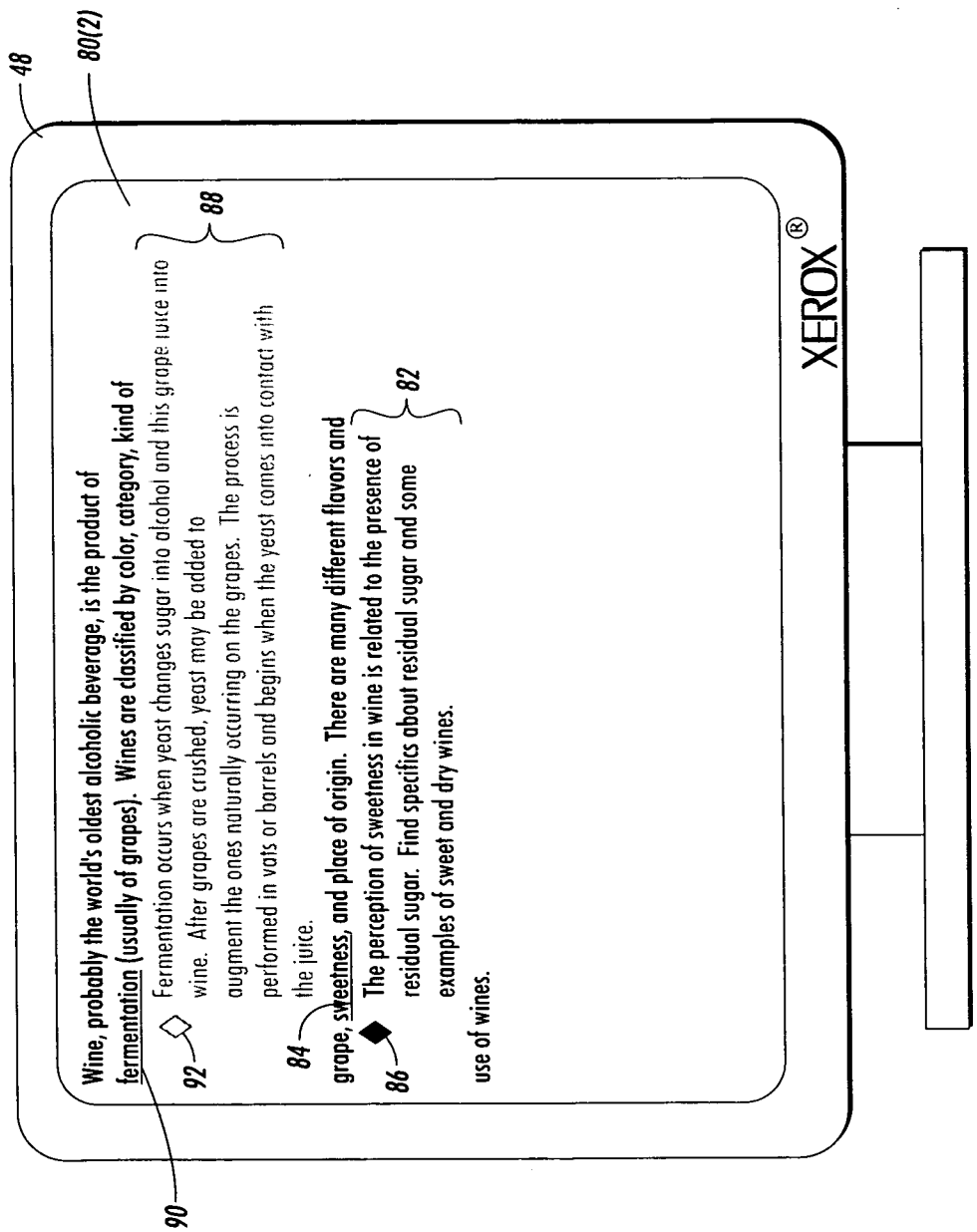
FIG. 12 is a screen shot of the fluid document in FIG. 10 using color and animation techniques to fluidly highlight a traversed temporary annotation.

At step 260 and referring now to FIG. 12, in this example the user returns from the traversed page to the original or prior display. Computer 40(1) executes instructions for generating and displaying fluid document 80(2), although in other embodiments other types of displays can be returned to, such as returning to a previously viewed window. Computer 40(1) generates and displays fluid document 80(2) in the same manner as document 80(1), except the computer 40(1) executes instructions for displaying the fermentation annotation 88 as having a red color. The red color is used to indicate to a user that the fermentation annotation 88 is the most recently traversed annotation, although other colors may be used. Further, computer 40(1) executes instructions for displaying the hyperlink 90 in bright red to show that the hyperlink 90 has been traversed, although again, other colors may be used. Performing the color animation described in step 260 avoids distracting the user when the user returns to document 80(2) from the traversed page since the appearance of document 80(2) is the same as document 80(1), except as described above.

Figure 13:
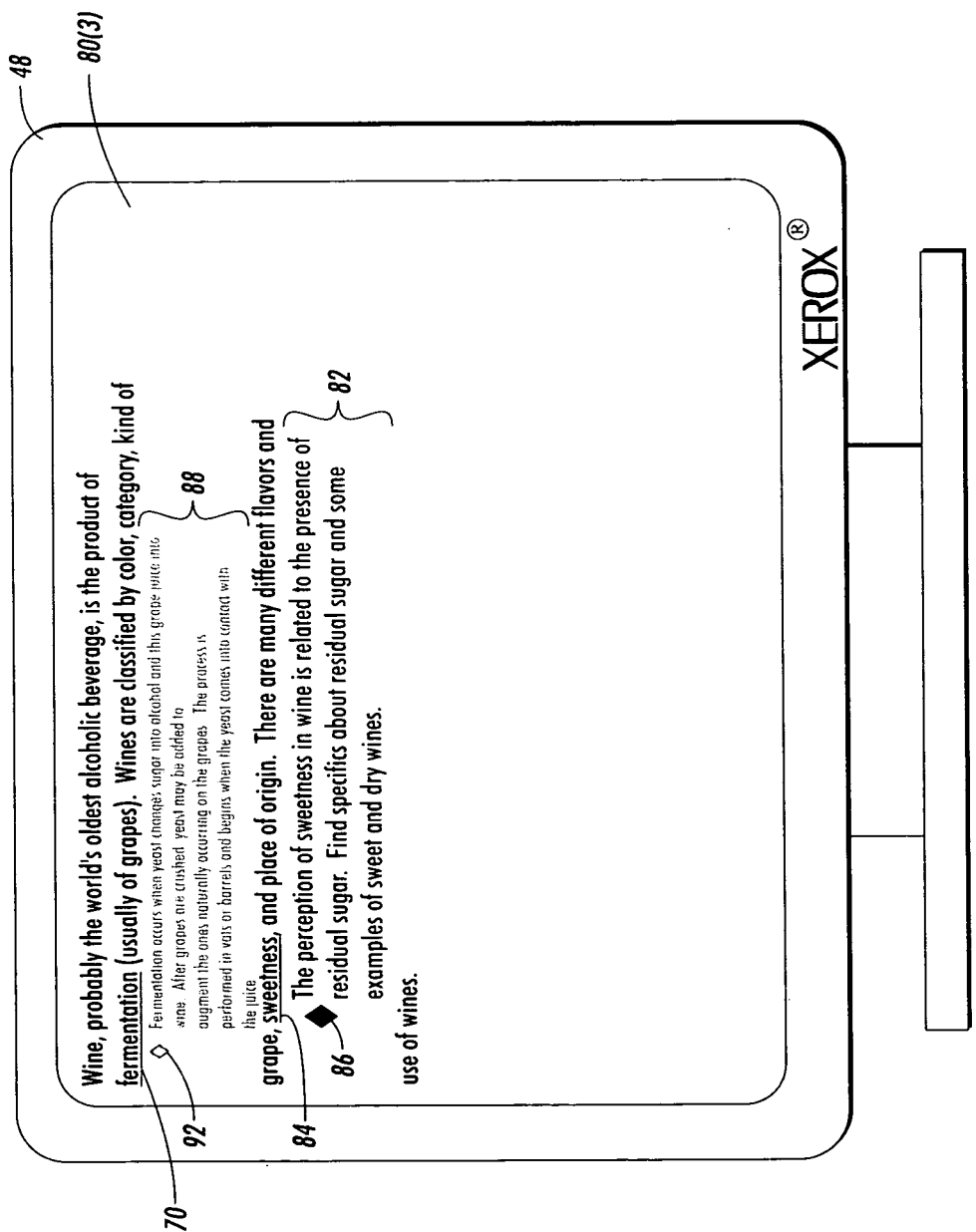
FIG. 13 is a screen shot of the fluid document in FIG. 11 where the traversed temporary annotation begins to automatically shrink in size.
Figure 14:
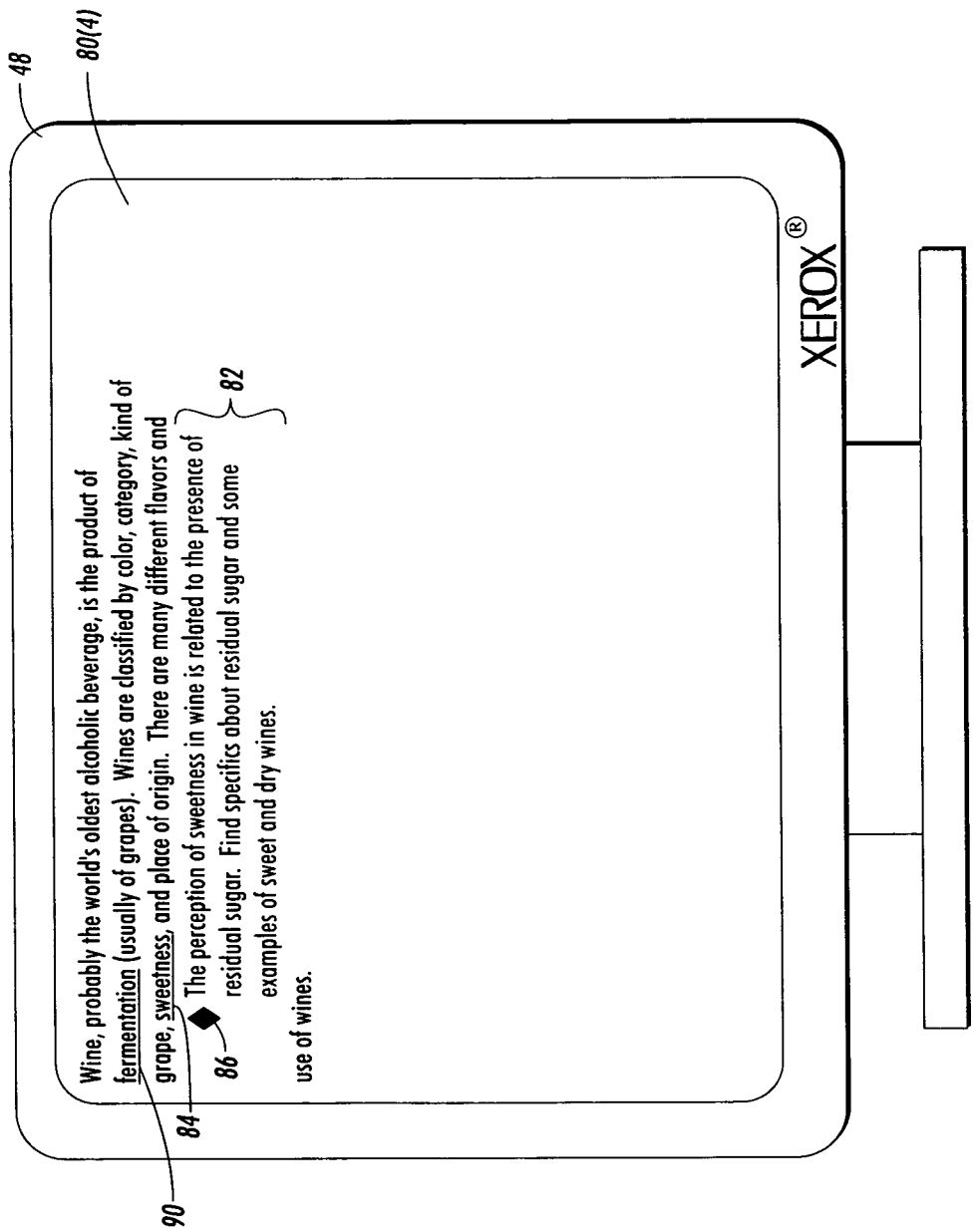
FIG. 14 is a screen shot of the fluid document in FIG. 12 where the traversed temporary annotation has shrunk completely away.

At step 270 and referring now to FIGS. 13-14, the computer 40(1) executes instructions for animating the location of departure. In this example, the computer 40(1) executes instructions for reducing the size of the fermentation annotation 88 to generate document 80(3). Document 80(3) is the same as fluid document 80(2), except the fermentation annotation 88 and the empty diamond shaped descriptor 92 are shown having a reduced size. Further, computer 40(1) initiates reducing the size of annotation 88 about 1.3 seconds after the user returns from the traversed page, although the elapsed time may vary from about less than one second to about one or more seconds and other amounts of time may be used. Again, in other embodiments, these and other animations can be executed on other areas in other displays.

Referring to FIG. 14, computer 40(1) in this example executes the instructions for reducing the size of the annotation 88 until it is no longer present to generate document 80(4). Document 80(4) is the same as fluid document 80(3), except the fermentation annotation 88 and the empty diamond shaped descriptor 92 are not present. Further, in this example computer 40(1) takes about 300 msec from the point in time it initiates reducing the size of annotation 88 until it is no longer present in the document 80(4), although the elapsed time may vary from about less than one second to about one or more seconds and other amounts of time may be used.

The color and motion animation examples described above in steps 240, and 260-270 provide several advantages. For instance, reducing the size of the fermentation annotation 88 as described in step 270 subtly draws the user's attention back towards the fermentation annotation 88 to promote an intuitive return to their previous reading/processing activity. This advantageous effect of the animation is a basic fact of human visual perception and reduces the user's need to explicitly scan documents 80(1)-80(4) looking for where they left off when traversing the hyperlinked documents. Another advantage is that there is less clutter in the documents 80(1)-80(4), and thus users are not unduly distracted by automatically removing thawed or temporary annotations, such as the fermentation annotation 88, as described above in connection with step 260.

An alternative process for drawing attention to an area or areas within a document in accordance with embodiments of the present invention will now be described with reference back to FIGS. 1-5, 8 and 10-11. Again, although described with reference to a document 50 as the display, the present invention can be used with other types of displays, such as a window.

Steps 200-250 are performed as described above, and at decision box 250, the computer 40(1) detects that the cursor has been moved over the fermentation hyperlink 90 and that one of the mouse buttons has been pressed to indicate the user's desire to traverse the fermentation hyperlink 90, although the computer 40(1) may detect the cursor over the sweetness hyperlink 84. In this example, the associated annotation 88 does not appear in the document 80(1) as a result of traversing fermentation hyperlink 90.

When this occurs, the anchor text in the fermentation hyperlink 90, such as "fermentation," changes color or "color-animates" to another color, such as from a black color to a bright red color (not illustrated) to provide the user with departure feedback until the new traversed page is displayed (not illustrated), although other techniques and colors may be used to provide departure feedback, such as a colored background highlight surrounding the anchor text in the hyperlink 90. The YES branch is followed and step 260 is performed as described above. When the user returns from the traversed page, the anchor text in the hyperlink 90 is color-animated back to its original color, although the colored background highlight may be shrunk down towards and into the middle portion of the anchor text upon return where the colored highlighting technique is used for providing departure feedback. Thereafter, step 270 is performed as described, and steps 200-270 are repeated until operation is terminated as described above.

Although the animation at a location of departure in a display upon return to the display is described above with reference to an unfrozen annotation in a document, the animations can be used in other applications to call attention to a location of departure in a display upon return to the display. For example, in an application where an operator is traversing links between displays which have a frozen annotation or no annotations, a descriptor object could be placed by the link anchor marking the most recently traversed link before the display or page is replaced with the destination display or page of the link. When the user returns to the prior page, the display looks the same as before, including the descriptor object, which helps with spatial recall. Immediately on return, the computer 40(1) could execute instructions to animate the departure location. In this example, computer 40(1) would execute instructions to shrink the descriptor object adjacent the frozen annotation or the traversed link using a short motion animation. This motion animation would effectively draw the user's attention to the location of departure.

The embodiments of the present invention provide a system 30 and methods for drawing attention to an area or areas within a display, such as documents 50, and 80(1)-80(4), using a combination of color and motion animation and timing techniques to intuitively apprise the user of the content they have interacted with. Further, the embodiments of the present invention enable users to conveniently determine areas of prior interest within a display while not requiring an undue amount of effort on the part of the user. Additionally, the embodiments provide for a smooth and pleasant reading experience using subtle sensory cues.

Figure 1:
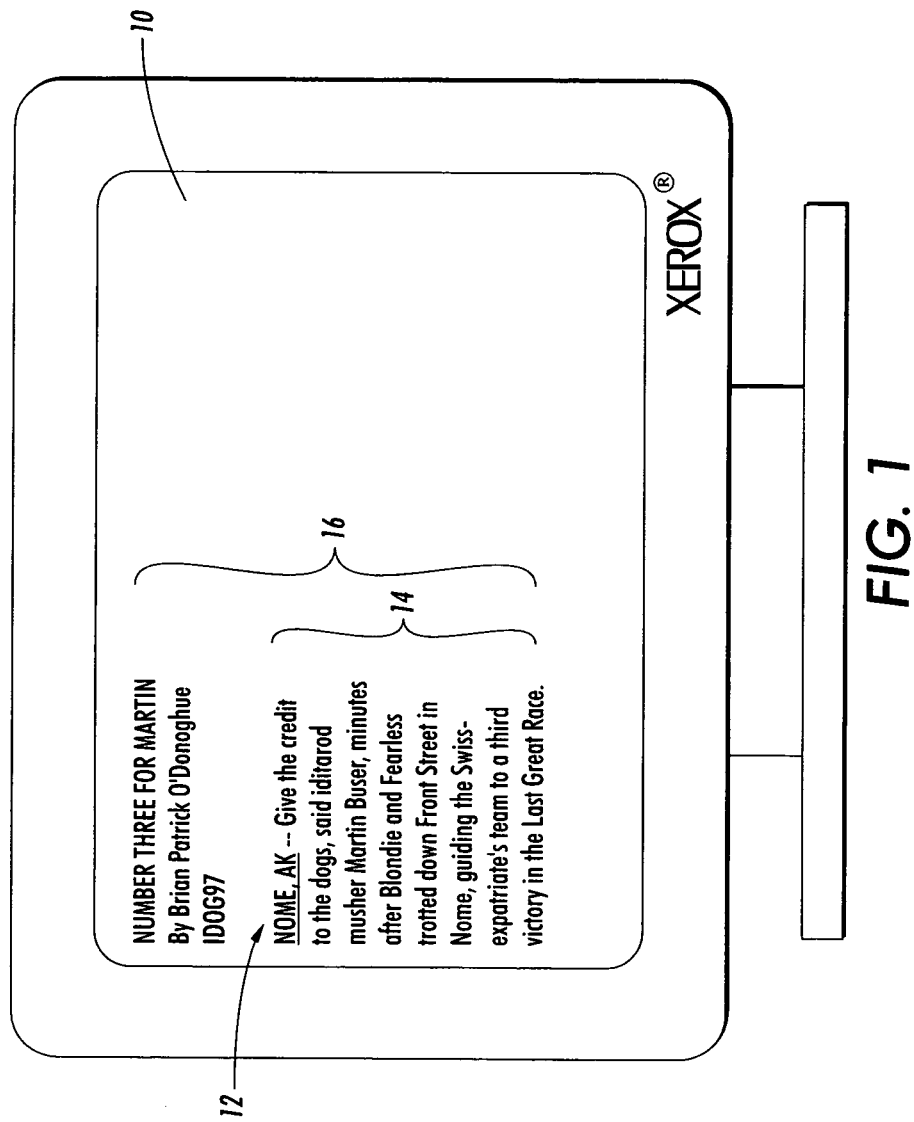
FIG. 1 is a screen shot of a fluid document displayed on a display device.
Figure 2:
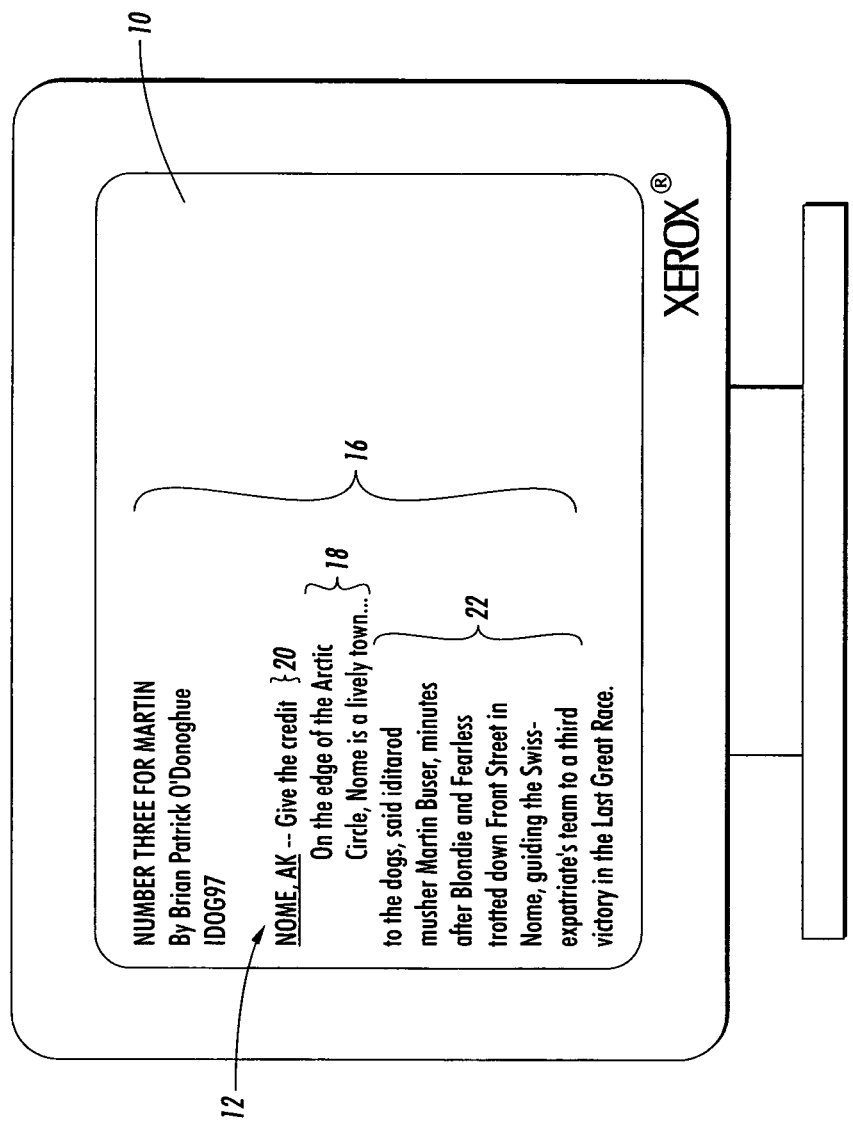
FIG. 2 is a screen shot of the fluid document in FIG. 1 using a fluid interline technique.
Figure 3:
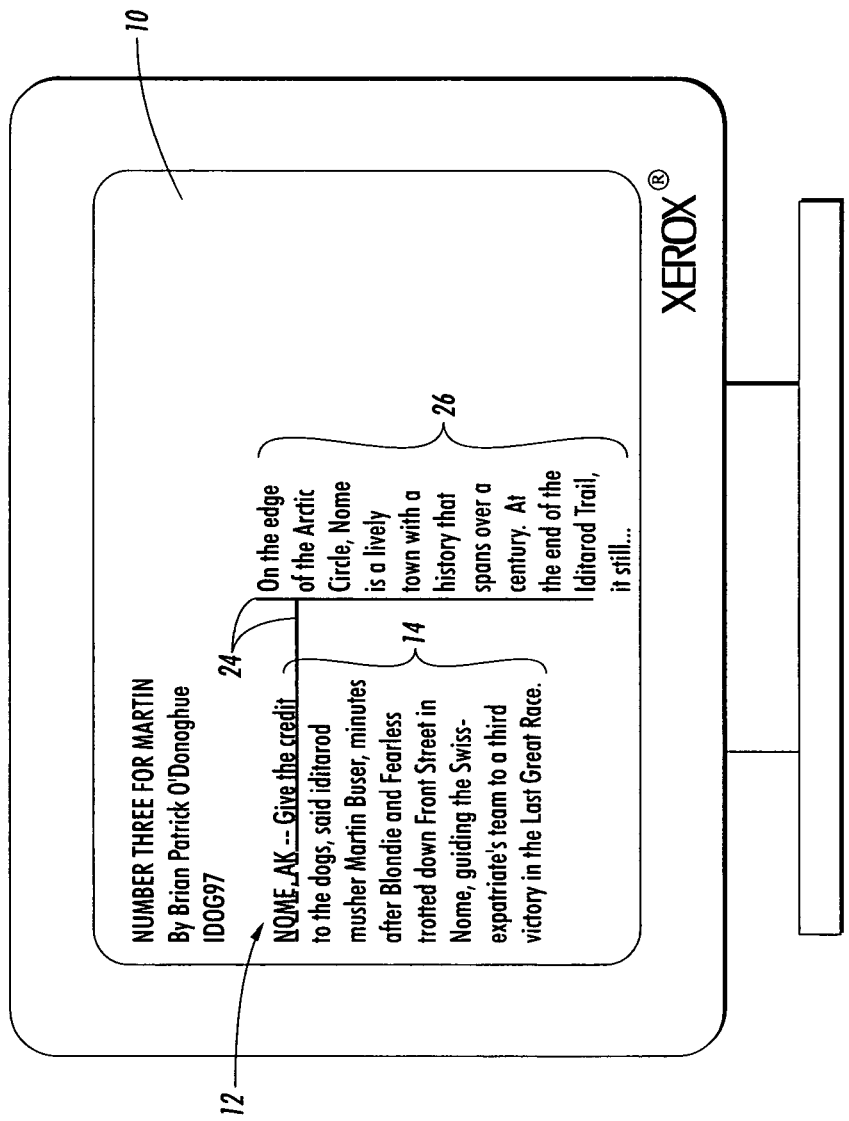
FIG. 3 is a screen shot of the fluid document in FIG. 1 using a fluid margin call-out technique.
Figure 4:
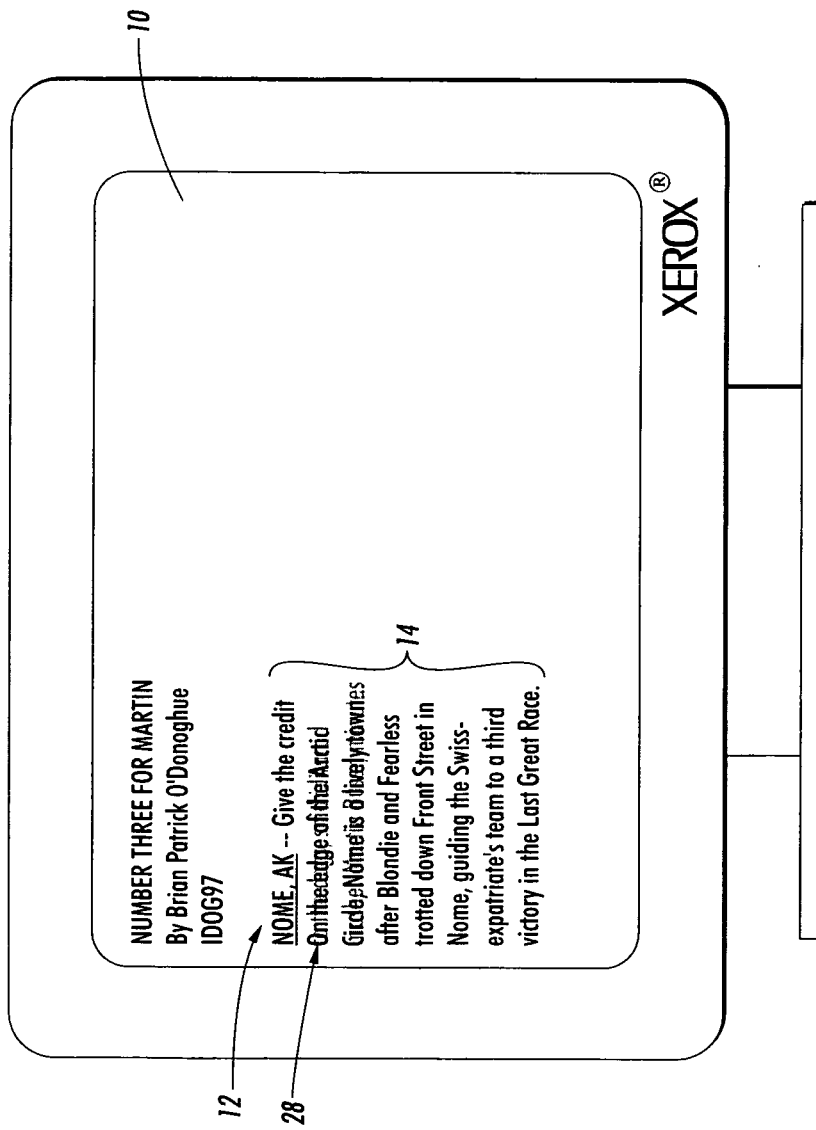
FIG. 4 is a screen shot of the fluid document in FIG. 1 using a fluid overlay technique.
Figure 5:
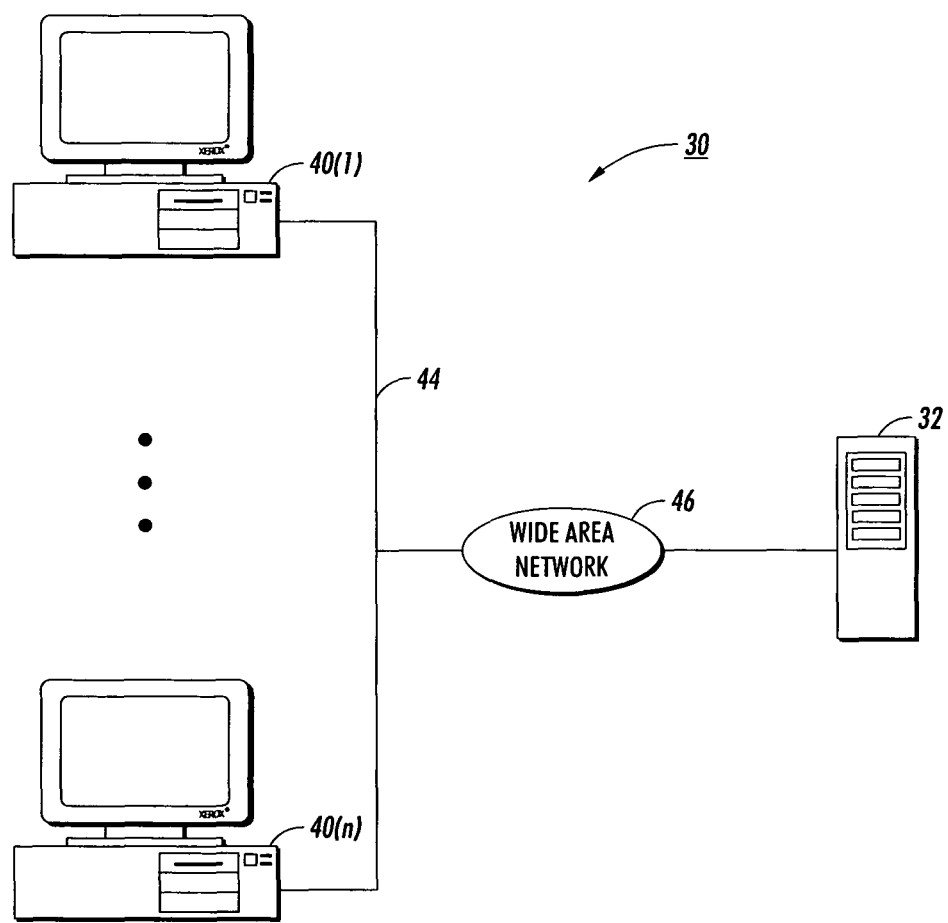
FIG. 5 is a diagram of a system for fluidly highlighting documents in accordance with embodiments of the present invention.

In embodiments of the present invention, the annotations 54, 58, 62(1)-62(2), 66 and 70 in document 50 and the annotations 82, 88 in documents 80(1)-80(4) as described above in connection with steps 100-140 and 200-270 are displayed using a fluid interline technique as described above in connection with FIGS. 1-2. It should be appreciated, however, that the fluid call-out or overlay techniques described above with respect to FIGS. 3-4 as well as other techniques may be used. It should also be appreciated that some or all of the instructions which are described as being stored and executed at either the server 32 or the computer 40(1) in connection with embodiments of the present invention may all be stored and executed together at one device, such as at the server 43 or at the computer 40(1). Further, the configuration of the system 30 as shown in FIG. 5 is provided for ease of description and illustration only. As such, the embodiments of the present invention as described herein should not be construed to limit the system 30 of the present invention or its associated operations.

While particular embodiments have been described, alternatives, modifications, variations, improvements, and substantial equivalents that are or may be presently unforeseen may arise to applicants or others skilled in the art. Accordingly, the appended claims as filed, and as they may be amended, are intended to embrace all such alternatives, modifications, variations, improvements, and substantial equivalents. Further, the recited order of processing elements or sequences, or the use of numbers, letters, or other designations therefor, is not intended to limit the claimed processes to any order except as may be specified in the claims.

What is claimed is:

1. A system for calling attention to a location of departure in a display, comprising:

a document comprising one or more hyperlinks each associated with an annotation and a descriptor comprising any shape for display to a user;

an identification module to identify movement of a cursor over one of the hyperlinks and to display the annotation associated with that hyperlink with the descriptor adjacent to the displayed annotation, wherein the annotation and the descriptor are assigned a common color as an indicator that the annotation is temporarily displayed;

a freeze display module to assign a freeze status to the annotation such that the annotation remains displayed and to assign a different common color for the freeze status to the annotation and the descriptor as an indication that the annotation is frozen;

a detection module to detect a selection of the hyperlink by the user and to traverse to a further document associated with the selected hyperlink;

an annotation module to identify the annotation associated with the selected hyperlink as the most recent traversed annotation and to change an assigned common color of that annotation to another color indicating a most recent traverse status;

a change module to return to the document and to gradually change the most recent traverse status color of the most recent traversed annotation to a further color for a previous visit status indicating that the annotation is previously visited;

a thaw module to remove the freeze status from the annotation and the associated descriptor;

a reduction module to continually reduce a size of the annotation and the associated descriptor upon returning from the further document to the document until the annotation and the associated descriptor completely disappear from the display; and a processor to execute the modules.

2. The system according to claim 1, wherein the reduction is initiated in an amount of time substantially after return to the document.

3. The system according to claim 2 wherein the amount of time is between 300 milliseconds and one second.

4. The system according to claim 1, further comprising:

permanently presenting the annotation upon receipt of a selection from the user for the annotation.

5. A method for calling attention to a location of departure in a display, comprising:

providing a document comprising one or more hyperlinks each associated with an annotation an a descriptor comprising any shape for display to a user;

identifying movement of a cursor over one of the hyperlinks and displaying the annotation associated with that hyperlink with the descriptor adjacent to the displayed annotation, wherein the annotation and the descriptor are assigned a common color as an indicator that the annotation is temporarily displayed;

assigning a freeze status to the annotation such that the annotation remains displayed;

assigning a different common color for the freeze status to the annotation and the descriptor as an indication that the annotation is frozen;

detecting a selection of the hyperlink by the user and traversing to a further document associated with the selected hyperlink;

identifying the annotation associated with the selected hyperlink as the most recent traversed annotation and changing an assigned common color of that annotation to another color indicating a most recent traverse status;

returning to the document and gradually changing the most recent traverse status color of the most recent traversed annotation to a further color for a previous visit status indicating that the annotation is previously visited;

removing the freeze status for the annotation and the associated descriptor; and continually reducing a size of the annotation and the associated descriptor upon returning from the further document to the document until the annotation and the associated descriptor completely disappear from the display.

6. The method according to claim 5, further comprising:

initiating the reduction in an amount of time substantially after return to the document.

7. The method according to claim 6, wherein the amount of time is between 300 milliseconds and one second.

8. The method according to claim 5, further comprising:

permanently presenting the annotation upon receipt of a selection from the user for the annotation.

9. A non-transitory computer-readable storage medium having stored thereon instructions, which when executed by at least one processor, causes the processor to perform:

providing a document comprising one or more hyperlinks each associated with an annotation and a descriptor comprising any shape for display to a user;

identifying movement of a cursor over one of the hyperlinks and displaying the annotation associated with that hyperlink with the descriptor adjacent to the displayed annotation, wherein the annotation and the descriptor are assigned a common color as an indicator that the annotation is temporarily displayed;

assigning a freeze status to the annotation such that the annotation remains displayed;

assigning a different common color for the freeze status to the annotation and the descriptor as an indication that the annotation is frozen;

detecting a selection of the hyperlink by the user and traversing to a further document associated with the selected hyperlink;

identifying the annotation associated with the selected hyperlink as the most recent traversed annotation and changing an assigned common color of that annotation to another color indicating a most recent traverse status;

returning to the document and gradually changing the most recent traverse status color of the most recent traversed annotation to a further color for a previous visit status indicating that the annotation is previously visited;

removing the freeze status for that annotation and the associated descriptor; and continually reducing a size of the annotation and the associated descriptor upon returning from the further document to the document until the annotation and the associated descriptor completely disappear from the display.

10. The non-transitory computer-readable storage medium according to claim 9, further comprising:

initiating the reduction in an amount of time substantially after return to the document.

11. The non-transitory computer-readable storage medium according to claim 10, wherein the amount of time is between 300 milliseconds and one second.

12. The non-transitory computer-readable storage medium according to claim 9, further comprising:

permanently presenting the annotation upon receipt of a selection from the user for the annotation.

\* \* \* \* \*